June 7, 1949.   J. ORNFELT   2,472,121
DECAFFEINATED SOLUBLE COFFEE
Filed Nov. 14, 1945
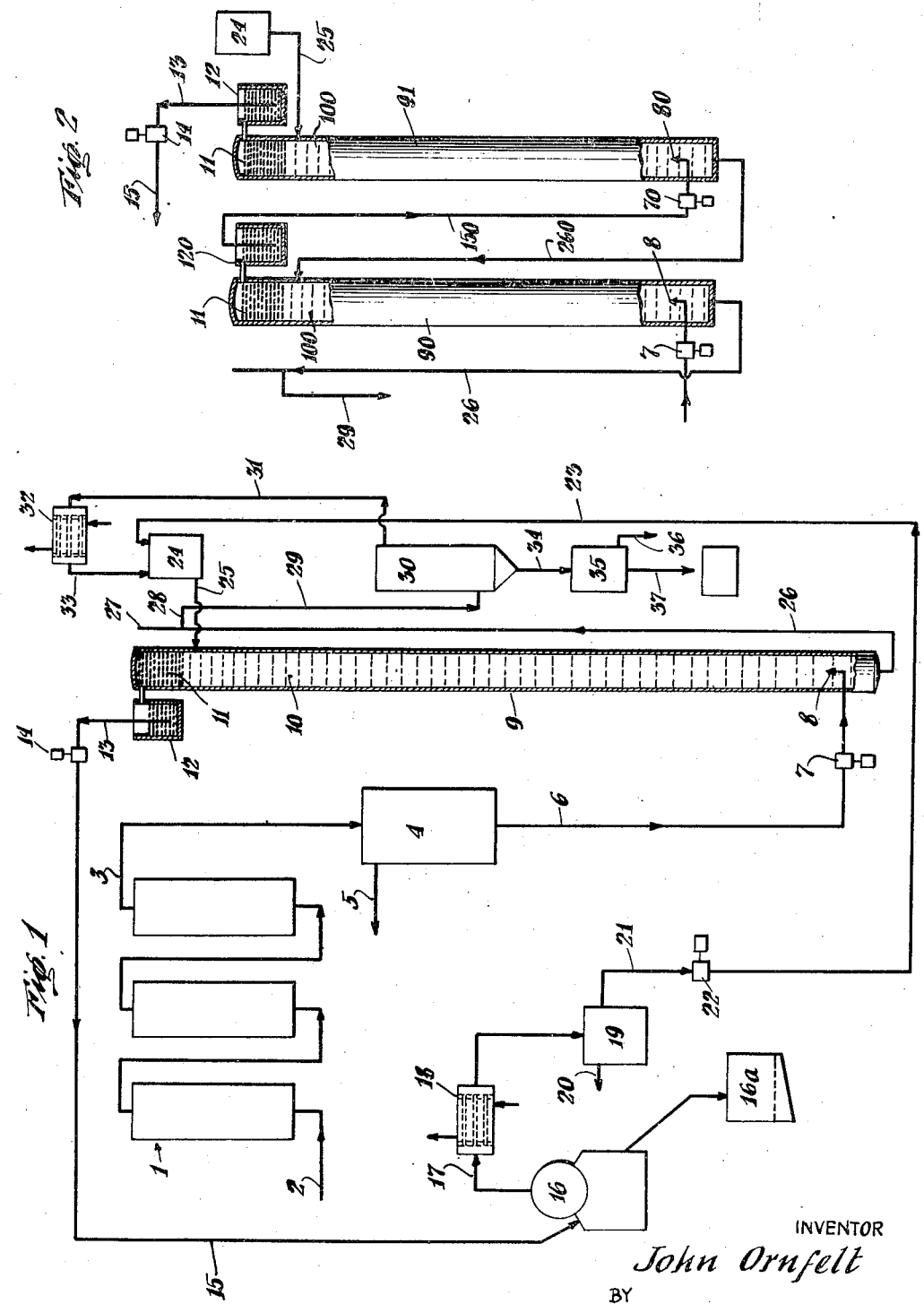
INVENTOR
John Ornfelt
BY
ATTORNEY Patented June 7, 1949

2,472,121

UNITED STATES PATENT OFFICE 2,472,121

DECAFFEINATED SOLUBLE COFFEE

John Ornfelt, Morristown, N. J., assignor, by mesne assignments, to American Home Foods, Inc., a corporation of Ohio Application November 14, 1945, Serial No. 628,421

6 Claims. (Cl. 99—70)

This invention relates to a process for producing decaffeinated soluble coffee.

Decaffeinated whole or ground coffee beans have been articles of commerce for many years and have met a favorable reception by those persons who are fond of coffee as a beverage but are over-susceptible to the stimulating effects of caffeine.

It is relatively easy to remove substantially all—say 90% or more—of the caffeine from coffee beans. One difficulty in making an acceptable product, however, is met in attempting to retain satisfactory coffee flavor. Another difficulty is an economic one, namely, the large investment required for profitable operation; the operation is one involving the processing of large amounts of solid and liquid material in relatively expensive equipment and must be carried out on a large scale to show a profit under competitive conditions.

Two types of commercial process have been developed; I call them respectively the "dry" and the "wet" process. Both have been applied exclusively, as far as I know, to green unroasted coffee.

In the "dry" process green coffee beans are extracted directly with an organic solvent, which removes caffeine. It has been found practically advantageous to raise the moisture content of the beans before the extraction by steaming to liberate caffeine from caffeine compounds in the beans and to inhibit the extraction of natural fats and waxes from the beans. After the extraction residual solvent is driven off from the beans and they are dried to their normal moisture content and then roasted in the usual way.

In the "wet" process the green beans are extracted with water which removes caffeine and a substantial part of the other water-solubles, the aqueous extract is extracted with a water-immiscible organic solvent to remove caffeine, the decaffeinated extract is reblended with the beans, the beans and aqueous extract are dried to the normal moisture content of the beans, and the dried mixture is roasted in the usual way.

I have discovered an improved method of decaffeinating coffee in which the decaffeinating step follows rather than precedes roasting, and which is especially applicable to the production of decaffeinated soluble coffee either in liquid or solid form.

One object of my invention is to provide an economical process for decaffeinating coffee.

Another object of my invention is to provide a decaffeinating process in which the decaffeinating step is applied to an extract of roasted coffee.

A further object of my invention is to provide a process especially suited to the production of soluble decaffeinated coffee.

Additional objects and advantages of my invention will be apparent from the following description.

According to my invention I first roast and grind coffee beans in the usual way. I then extract the ground coffee by percolating hot water through it, the water entering the coffee mass at near its boiling point. This extraction removes from the ground coffee substantially all the caffeine and all the desired water-soluble and water-dispersable materials which give coffee its beverage value. I carry out the extraction, and a subsequent concentration step if required, in such a way as to produce a highly concentrated aqueous extract containing preferably in the neighborhood of 40-50% solids.

I then extract this aqueous extract with a volatile organic water-immiscible solvent for caffeine such as benzene, a chlorinated hydrocarbon such as methylene chloride, di- or tri-chloroethylene or ethylene chloride, or other commercially available water-immiscible caffeine solvent.

I have found that the concentrated aqueous coffee extract has a strong tendency to form emulsions with such organic solvents, but that emulsion formation can be avoided by dispersing the aqueous extract in fine droplets in the solvent. I prefer to do this by pumping the aqueous extract under pressure through a fine nozzle into a column of solvent and collecting the decaffeinated extract in a layer after passage of the droplets through the solvent. If the solvent used is specifically lighter than the extract, I introduce the latter at the top of the column; if the solvent is specifically heavier, I introduce the extract at the bottom of the column.

In addition to the avoidance of emulsion formation there is another advantage in dispersing the coffee extract in the solvent instead of dispersing the solvent in the extract; the dispersed phase moves through the column in a relatively short time—say 2-3 minutes—whereas the time of passage of the continuous phase is much slower. It is an advantage to process a relatively unstable material like coffee extract as rapidly as possible; hence it is advantageously made the dispersed phase in the decaffeination step.

I have further found that for maximum efficiency the column of solvent should be of limited height. The fine droplets of aqueous extract appear to retain their identity while passing through a certain length of column and then to coalesce to larger droplets, thus reducing the surface exposed to the solvent. For example, I found that when pumping a concentrated aqueous coffee extract containing 40-50% solids through a nozzle having an orifice 0.4 mm. in diameter under 2⅔ atmospheres (40 pounds per square inch) pressure into the bottom of a column of methylene chloride at or slightly below room temperature, a fine cloud of extract droplets rose through the solvent. These appeared to retain their state of fine subdivision for a height of 3.5 to 4.5 m. (12 to 15 feet) above the nozzle and then to coalesce gradually to larger droplets. Accordingly, when a travel through the solvent of more than 3.5-4.5 m. is desirable, I prefer to use two or more columns in series as described below.

In my process I separately withdraw the decaffeinated extract and solvent-caffeine solution from the top and bottom of the extraction vessel. In the case of extraction columns I prefer to do this continuously, but the extraction can also be carried out batchwise.

The decaffeinated extract contains some entrained and dissolved solvent which must be removed. If the extract is to be sold in the liquid form, I subject it to a steaming or distilling operation to remove solvent, and then adjust it by dilution if necessary to the desired concentration. If it is to be sold or used in powered solid form I subject it to an evaporative drying operation, e. g. in a vacuum drum drier, and recover the dried solid residue for packaging or use. In either case I condense the distillate, separate the solvent and aqueous layers, as by decantation, and return the solvent to the extraction system for reuse.

The solvent withdrawn from the extraction vessel contains the extracted caffeine in solution. Since caffeine has a relatively high sales value it is advantageously recovered and purified, for example to U. S. P. grade. One satisfactory way of doing this is to run the solution to a distillation-recovery unit from which solvent is recovered as an overhead distillate and returned to the extraction system, and caffeine is recovered as a residue and recrystallized or otherwise purified.

In order to illustrate and further clarify my invention I describe below specific embodiments, which are intended to be illustrative only and not to limit the invention.

In the accompanying drawing:

Fig. 1 is a diagrammatic flow sheet of one method of making decaffeinated soluble coffee by my invention; and Fig. 2 is a flow sheet of the decaffeinating step carried out in two series stages.

According to the illustrated embodiment of my invention I charge the coffee extractors 1 with ground roasted coffee and pass hot water through the inlet 2 into the extractors and through them in series until the desired extraction of water-solubles has been effected. The water advantageously is introduced at a temperature of 88°-93° C. (190°-200° F.) and leaves the extractors at 3 at a temperature of 27°-32° C. (80°-90° F.). The extract at this point may contain, say, about 35% solids, in which case I pass it through an evaporative concentrator 4 of conventional type to bring its solids content to 40-50%, a concentration which I have found favorable for further processing. Excess water is removed from the concentrator at 5, and the concentrated extract is removed at 6. A pump 7 forces the extract through nozzle 8 in the bottom of decaffeinating column 9 under a pressure of 2⅔ atmospheres (40 lbs. per sq. in.). The nozzle may be made of stainless steel and has an aperture 0.4 mm. in diameter.

The decaffeinating column is made of industrial glass tubing 8 m. (26 feet) high and is provided with suitable fittings and inlets and outlets as indicated. It is desirable but not essential to provide a cooling jacket (not shown) around column 9 and maintain its temperature at 5°-10° C. (40°-50° F.).

Column 9 is filled for the major part of its length with a layer 10 of methylene chloride which is specifically heavier than the coffee extract. A layer 11 of the latter collects on top of the solvent, and overflows into pot 12 whence it is pumped by pipe 13, pump 14 and pipe 15 to vacuum drum drier 16. The solid residue from the drum drier, viz. solid soluble decaffeinated coffee, is continuously discharged from the drier to a bin 16a for packaging, use or further processing as desired. The vapors from drier 16 are taken off by pipe 17 to condenser 18, and the condensate run to decanter 19. Suitable vacuum-producing equipment (not shown) is provided. The aqueous layer is withdrawn from the decanter at 20 and sent to waste or otherwise disposed of. The solvent layer is withdrawn at 21 and returned by pump 22 and pipe 23 to solvent-storage tank 24 for reuse in the decaffeination.

To provide the column with a supply of methylene chloride the latter is fed to the top of the column at a controlled rate from solvent-storage tank 24 through pipe 25. The solvent flows by gravity from the bottom of the column to standpipe 26 which is vented at the top at 27 and has an overflow 28, the height of which determines the height of solvent in the column.

The solvent leaving the column is charged with caffeine. To recover the latter and condition the solvent for reuse, the solvent is led from overflow 28 through pipe 29 to evaporator 30. Here the solvent is separated from the caffeine by distillation, the distillate being led through pipe 31 to condenser 32 whence the condensate is run through pipe 33 to solvent-storage tank 24.

The caffeine residue left by evaporation of the solvent is removed from evaporator 30 at 34 and purified at 35 by carbon treatment and recrystallization from water. Impurities are removed at 36 and the purified caffeine is withdrawn at 37 for packaging or further treatment as desired.

Suitable valves, switches and similar control devices are provided for regulating the flow of the various fluids in the system.

The amount of solvent I circulate per unit volume of coffee extract in my process depends to some extent on the equipment used. In the equipment illustrated in Fig. 1, with a single extractive column I circulate approximately 8 volumes of solvent to each volume of coffee extract circulated and thereby remove 90-97% of the caffeine in the extract; the caffeine amounts ordinarily to about 5% of the extract solids. For example in approximate round numbers 8000 l. (2000 gal.) methylene chloride circulated countercurrent to 1000 l. (250 gal.) coffee extract containing 600 kg. (1300 lbs.) solids removes 27-28 kg. (60-62 lbs.) or more of the 30 kg. (66 lbs.) caffeine ordinarily contained in the solids. About ¾ or more of the caffeine removed is readily recovered as U. S. P. caffeine. With multiple columns in series, as illustrated in Fig. 2 and described below, less solvent is required, e. g. a ratio of about 6 volumes of solvent to each volume of coffee extract.

In operating the process as described above I observed that about half-way up the decaffeinating column there was a tendency, not observable in the lower half of the column, for the fine droplets of dispersed coffee extract to coalesce into larger droplets, thus reducing the liquid-liquid interface and consequently the extraction capacity. Capacity may be maintained throughout the column of solvent by operating two columns 90 and 91 in series as illustrated in Fig. 2. Here the solvent columns 100 are preferably each 3.5 to 4.5 m. (12 to 15 feet) high. Solvent from column 91 overflows through pipe 260 to the top of column 90, and pot 120, pipe 150 and pump 70 are provided to circulate partially decaffeinated extract under pressure from the top of column 90 through nozzle 80 into the bottom of solvent 100 in column 91. Otherwise the operation of the process is similar to that previously described.

While continuous operation of my process is believed preferable, the decaffeination step may be operated batchwise as noted above. In batchwise operation I introduce a charge of cooled aqueous coffee extract into a broad shallow covered extraction vessel (in order to provide a high surface: volume ratio), and also introduce several times its volume of methylene chloride. I agitate the charge with a slowly rotating stirrer (to avoid emulsion formation) until approximate equilibrium between the liquids is reached, stop stirring, allow to settle, and withdraw the solvent layer. I repeat the extraction in the same way until the desired degree of decaffeination is effected, and work up the decaffeinated aqueous coffee extract and the caffeine-laden solvent substantially as described for the continuous process with those variations in procedure obviously necessitated by batch operation.

Other modifications of my process may also be made within the scope of the appended claims without departing from my invention.

I claim:

1. The process of producing soluble decaffeinated coffee, which comprises forming an aqueous extract of ground roasted coffee beans which contains at least about 40 percent by weight of soluble coffee solids comprising water-soluble and water-dispersible coffee constituents of beverage value, extracting caffeine therefrom by contact of the aqueous extract with a water-immiscible organic solvent for caffeine, effecting contact of aqueous extract and solvent until at least about 90 percent by weight of the caffeine has been removed from the aqueous extract, separating the decaffeinated aqueous extract from the caffeine-laden solvent, and freeing of residual organic solvent the aqueous coffee extract decaffeinated by contact with the organic solvent to produce soluble decaffeinated coffee.

2. In combination with the process defined in claim 1, the further step of removing water from the decaffeinated aqueous coffee extract, whereby a residue of solid soluble decaffeinated coffee is obtained.

3. The process of decaffeinating coffee, which comprises extracting ground roasted coffee beans with hot water to produce a concentrated aqueous extract containing at least about 40 percent soluble coffee solids including caffeine and water-soluble and water-dispersible coffee constituents of beverage value, continuously feeding into a column a water-immiscible organic solvent for caffeine having a specific gravity different from that of the aqueous extract, continuously dispersing said aqueous coffee extract at a reduced temperature in the form of fine droplets into the solvent in the column at such a point as will permit travel of the droplets by gravity through the major part of the height of the body of solvent and the formation of a layer of aqueous extract at the end of their travel, whereby caffeine is extracted from the aqueous extract by the solvent, continuously removing decaffeinated aqueous extract from the aqueous extract layer, continuously removing caffeine-laden solvent from the end of the column remote from the aqueous extract layer, and freeing of residual solvent aqueous extract decaffeinated by contact with the solvent.

4. The process of producing solid soluble decaffeinated coffee, which comprises forming an aqueous extract of ground roasted coffee beans, said extract containing at least about 40 percent by weight of soluble coffee solids including caffeine and water-soluble and water-dispersible coffee constituents of beverage value, continuously feeding methylene chloride into a column to provide a vertically elongated layer thereof, continuously dispersing said aqueous coffee extract in the form of fine droplets into the methylene chloride at a point near the bottom of the elongated layer, whereby the droplets ascend through said elongated layer and caffeine is extracted from the droplets by the methlyene chloride, continuously removing at least partially decaffeinated coffee extract from the top of the elongated methylene chloride layer, evaporating at low temperature to substantial dryness coffee extract decaffeinated by contact with the methylene chloride to produce a residue of solid soluble decaffeinated coffee, separating methylene chloride from the overhead distillate of the evaporation, and reusing it to decaffeinate additional coffee extract.

5. The process of claim 4, in which the decaffeination of the coffee extract takes place in two series stages in each of which the extract droplets ascend through at least about 3.5 m. and not more than about 4.5 m. of methylene chloride and in which coffee extract and methylene chloride are passed countercurrent to each other from stage to stage.

6. The process of claim 4, in which the volume ratio of methylene chloride circulated to coffee extract circulated is not less than about 6:1, whereby not less than about 90 percent of the original caffeine content of the coffee extract is removed.

JOHN ORNFELT.

REFERENCES CITED

The following references are of record in the file of this patent:

UNITED STATES PATENTS

| Number | Name | Date |
|---|---|---|
| 1,015,271 | Geisler | Jan. 16, 1912 |
| 1,977,416 | Wilder | Oct. 16, 1934 |
| 2,309,092 | Berry et al. | Jan. 26, 1943 |
| 2,335,206 | Darling | Nov. 23, 1943 |

FOREIGN PATENTS

| Number | Country | Date |
|---|---|---|
| 339,543 | Great Britain | 1930 |
| 397,323 | Great Britain | 1933 |

Certificate of Correction

Patent No. 2,472,121. June 7, 1949.

JOHN ORNFELT

It is hereby certified that errors appear in the printed specification of the above numbered patent requiring correction as follows:

Column 3, line 32, for the word "powered" read *powdered*; column 5, line 31, for "surface: volume" read *surface:volume*; column 6, line 34, claim 4, for "methlyene" read *methylene*;

and that the said Letters Patent should be read with these corrections therein that the same may conform to the record of the case in the Patent Office.

Signed and sealed this 1st day of November, A. D. 1949.

[SEAL]

THOMAS F. MURPHY,
*Assistant Commissioner of Patents.*